United States Patent

[11] 3,539,021

| [72] | Inventors | Harry E. Campen<br>Peoria;<br>Max D. Fryrear, Joliet; Daniel Pasquini,<br>Peoria; Eugene M. Wilson, Joliet, Illinois |
|---|---|---|
| [21] | Appl. No. | 730,528 |
| [22] | Filed | May 20, 1968 |
| [45] | Patented | Nov. 10, 1970 |
| [73] | Assignee | Caterpillar Tractor Co.<br>Peoria, Illinois<br>a corporation of California |

[54] ARRANGEMENT OF FLEXIBLE CONDUITS FOR TRACK-TYPE TRACTORS
4 Claims, 5 Drawing Figs.

| [52] | U.S. Cl. | 172/803 |
|---|---|---|
| [51] | Int. Cl. | E02f 3/76 |
| [50] | Field of Search | 172/800–809; 60/SZHE |

[56] References Cited
UNITED STATES PATENTS

| 1,977,817 | 10/1934 | Bird | 172/802 |
|---|---|---|---|
| 2,687,586 | 8/1954 | Dickinson | 172/805 |
| 2,730,823 | 1/1956 | Cassidy | 172/805 |

Primary Examiner—Robert E. Pulfrey
Assistant Examiner—Ronald C. Harrington
Attorney—Fryer, Tjensvold, Feix, Phillips & Lempio ABSTRACT: An arrangement of flexible conduits for hydraulic fluid which is used to actuate jacks located on a bulldozer for the purpose of adjusting components of the bulldozer and for varying its attitude with respect to the ground. The arrangement includes shrouds and protective plates which enable the flexible conduits or hoses to be safely led up to and through the bulldozer push arms.

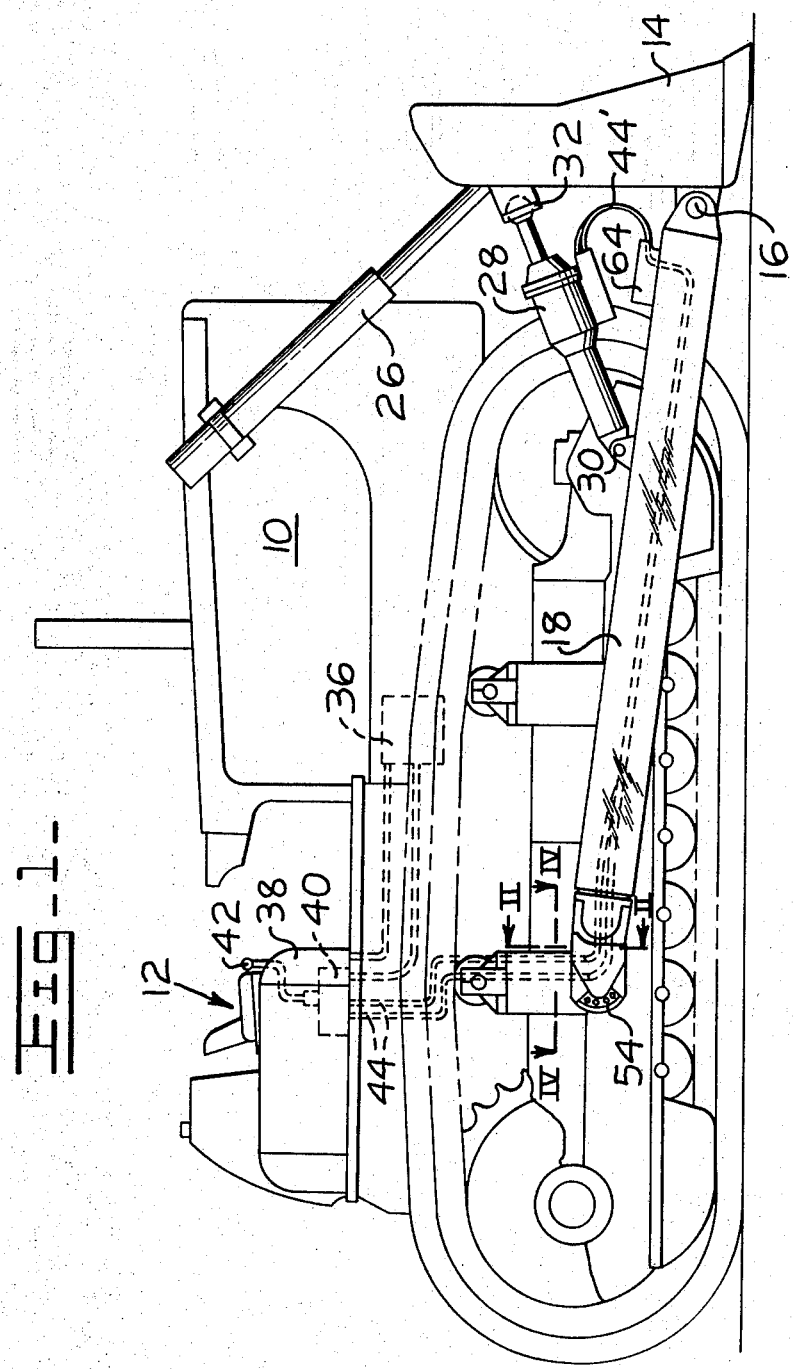

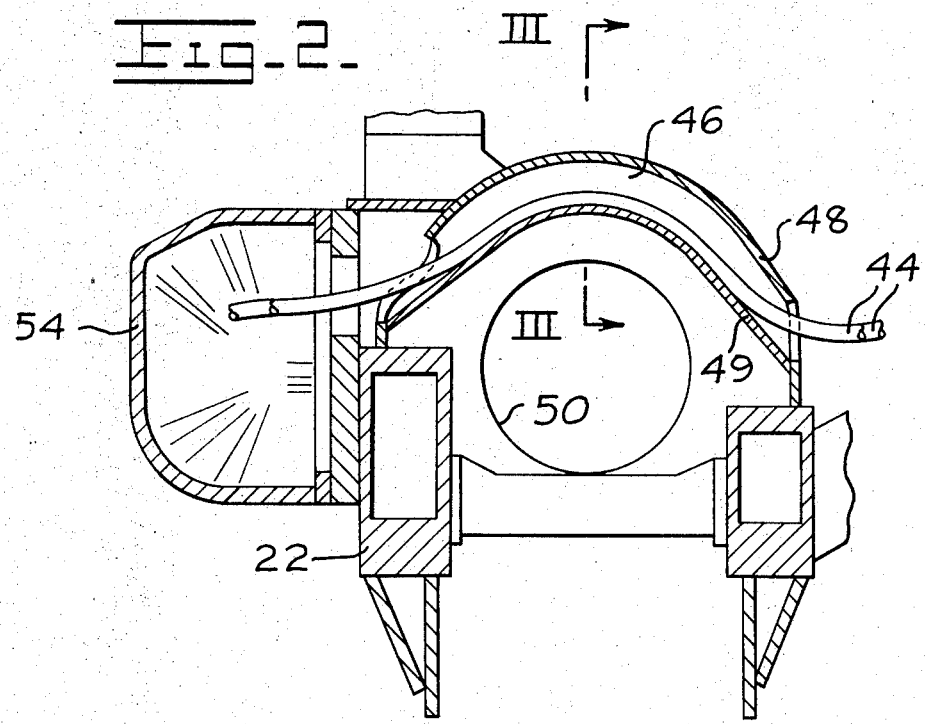
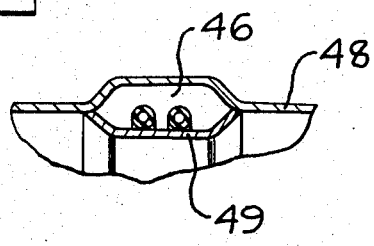

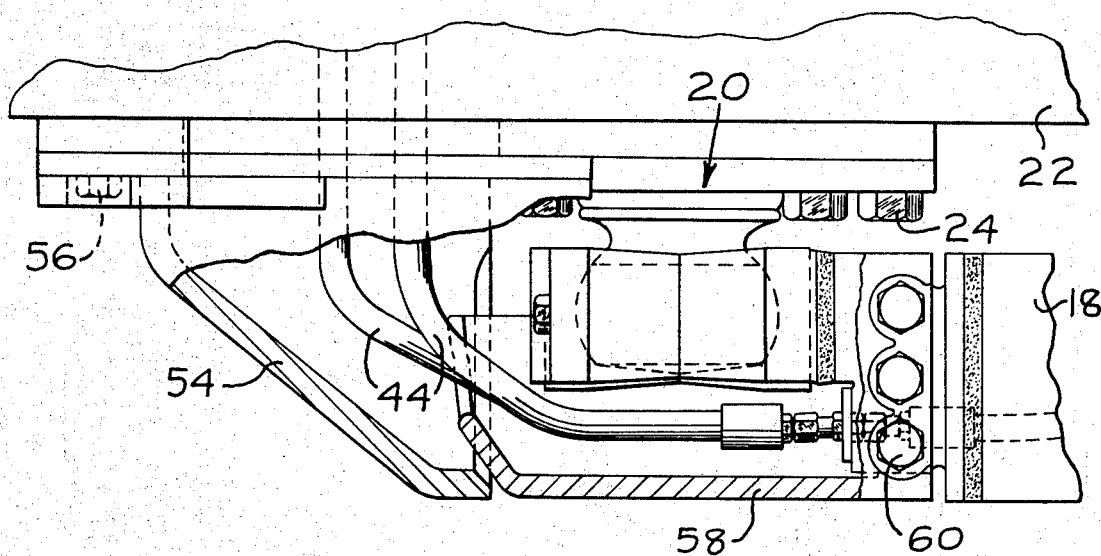
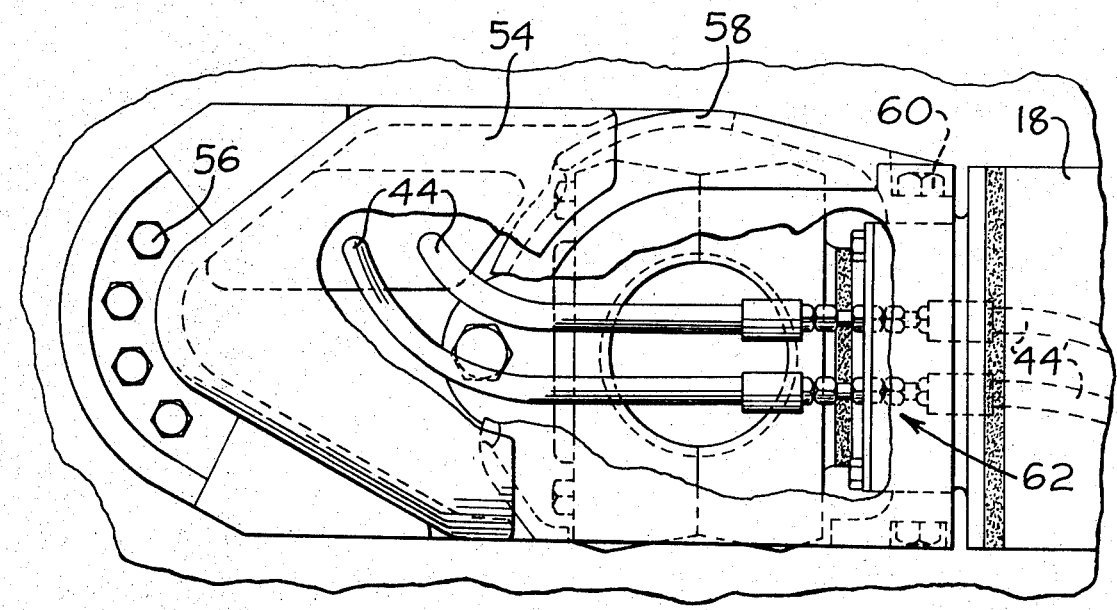

ARRANGEMENT OF FLEXIBLE CONDUITS FOR TRACK-TYPE TRACTORS

Hydraulic conduits or hoses extending between tractors and implements, being necessarily flexible, have traditionally been costly, undependable and hazardous. Since heavy machine components are often supported by hydraulic fluid, breakage of lines can cause costly and dangerous accidents.

Currently, there is a tendency toward the use of operator controlled adjustments of components on implements such as bulldozer blades which are carried forwardly of a tractor on push arms or C-frames. It is where the hydraulic motors or jacks are mounted on or near the blade itself that hoses must be draped between the tractor and the blade. Any shortening or reduction in exposed hose is highly desirable, and the present invention takes advantage of the hollow construction of the push arms to protect otherwise exposed conduits and hoses and also provides special protection at the point of entry of the hoses into the push arms.

The invention will be explained in greater detail in the following specification by reference to the accompanying drawings, and objects and advantages of the invention will be made apparent in the specification.

In the drawings:

FIG. 1 is a view in side elevation of a track-type tractor with a bulldozer, showing the arrangement of flexible conduits embodying the present invention;

FIG. 2 is an enlarged sectional view taken approximately on the line II–II of FIG. 1;

FIG. 3 is a fragmentary sectional view taken on a line III–III of FIG. 2;

FIG. 4 is a fragmentary plan view with parts broken away, taken on the line IV–IV of FIG. 1; and FIG. 5 is a view in side elevation, with parts broken away, of the elements shown in FIG. 4.

FIG. 1 shows a conventional track-type tractor with an engine compartment at 10 and an operator station generally indicated at 12. A bulldozer blade 14 is pivoted as at 16 to the forward ends of push arms, one of which is shown at 18. The push arms are supported conventionally on universal joints shown generally at 20 in FIG. 4, the ball portion being secured to the outer track roller frame 22 (see also FIG. 2) as by cap screws 24.

The bulldozer blade is raised and lowered by a pair of hydraulic motors, one of which is illustrated in FIG. 1 as a lift jack 26 which does not form a part of the present invention since the conduits to the jacks will be carried entirely by the tractor and need not extend between the tractor and the blade. Tilting of the blade is accomplished by a hydraulic jack 28 shown as comprising part of a strut which extends between the push arm where it is pivoted at 30 and the back of the blade where it is connected by a ball and socket joint 32.

The present invention will be described in connection with hoses for hydraulic fluid for extending and retracting the jack 28, though it is to be understood that other jacks for other adjustments or components on an implement can be served in the manner to be described. An example of an implement having more than one jack served by hydraulic lines from the tractor is found in our Assignees' copending U.S. Pat. application of Balzer and Kroth for "System For Actuation Of Hydraulic Motors On Tractor Powered Implements", Ser. No. 731,123, filed May 22, 1968 now U.S. Pat. No. 3,512,453.

In FIG. 1, a hydraulic pump powered by a power takeoff shaft of the tractor engine is represented at 36 as supplying fluid under pressure to a tank 38 which contains a control valve 40 adjusted by a lever 42 within reach of the operator's station. The valve may be actuated to direct a supply alternately through either of two lines 44, while the other serves as a return line to actuate the double-acting jack 28 in a conventional and well-known manner. The present invention is concerned with the arrangement of these lines, particularly between the control valve and the rear ends of the push arms through which they pass. The lines are directed downwardly, as might be seen in FIG. 1, from the tank and control valve and thence pass transversely outwardly, where they are shown at 44 in FIG. 2, through a protective tunnel 46 (see also FIG. 3), formed by upward deformation of a part of the protective enclosure 48 which extends over and protects the recoil mechanism, not shown, of the tractor track. The recoil mechanism extends through an opening 50, FIG. 2, in a web which supports the protective enclosure. A plate 49 completes the protective tunnel. This provides adequate protection from falling rocks, earth and other debris to a point just outside the track frame where the lines turn forwardly, as shown in FIGS. 4 and 5, to enter the rear end of the push arm. At this area, a shroud shown at 54 in FIGS. 1, 2, 4 and 5 is secured to the track frame 22 as by cap screws shown at 56 in FIGS. 4 and 5. A companion shroud, best shown at 58 in FIGS. 4 and 5, is secured as by cap screws 60 to the rear portion of the push arm and is disposed outboard of the universal joint which supports the push arm. The rear end of the shroud 58 is, as best shown in FIG. 5, formed on an arc struck from the center of the universal joint and extends a short distance into the shroud 54 so that upon raising and lowering of the push arm, the shrouds are articulated with respect to each other and serve adequately to protect the hoses 44 from damage where they are disposed outwardly of the track roller frame. Suitable conduits and fittings are generally indicated at 62 in FIG. 5 and extend through the rear face of the push arm so that hoses 44' communicate with the hoses 44 and extend forwardly of the push arms.

At the forward end of the push arms, as shown in FIG. 1, the hoses are protected by a small box 64 on top of the push arm and then curve upwardly for connection with the jack 28. It should be understood that this exposed loop or curve in the hoses 44' is exceedingly small as compared to the exposed hoses previously used which were generally draped from the front of the tractor radiator guard to the back on the dozer, and they are further more located toward the very outer end of the blade where they are less liable to be struck by debris and partially protected by the existence of the jack and strut which is positioned directly above them.

We claim:

1. In combination with a tractor and an implement mounted at one end thereof on arms which are pivotally connected to the tractor at the sides thereof and in which conduits lead from a valve near a tractor operator's station to a hydraulic motor on the implement, the improvement which comprises tunnel means and shroud means enclosing and protecting said conduits where they extend outwardly and toward the adjacent end of one of said arms through which they extend toward the implement, said shroud means comprising a first shroud member fixed to the tractor, enclosing the emergence of the conduits from the tunnel means and opening toward said one arm, and a second shroud member fixed to and enclosing the end of said one arm with said first shroud member and opening toward said first shroud member.

2. The invention of claim 1 wherein said first and second shroud members being so positioned with respect to each other to completely enclose the end of said one arm upon rotation thereof relative to said tractor.

3. The improvement of claim 1 in which said second shroud member extends rearwardly toward said first shroud member to completely cover a pivot means pivotally connecting said one arm to said tractor.

4. The improvement of claim 1 in which the tractor is a track-type tractor and wherein said tunnel means comprises a cover covering a track recoil mechanism.